United States Patent [19]
Wahls

[11] 4,085,962
[45] Apr. 25, 1978

[54] SEAT ASSEMBLY

[75] Inventor: Robert A. Wahls, McHenry, Ill.

[73] Assignee: The Freedman Seating Company, Evanston, Ill.

[21] Appl. No.: 722,681

[22] Filed: Sep. 13, 1976

[51] Int. Cl.² ............................................. B60N 1/10
[52] U.S. Cl. .................................... 296/65 R; 296/69; 297/65
[58] Field of Search ................. 296/65 R, 69; 297/62, 297/63, 64, 65, 67, 317, 322

[56] References Cited
U.S. PATENT DOCUMENTS

| | | | |
|---|---|---|---|
| 3,887,229 | 6/1975 | Plume | 297/65 |
| 3,932,902 | 1/1976 | Belk | 297/65 |
| 3,964,785 | 6/1976 | Plume | 297/64 |
| 4,018,166 | 4/1977 | Gutridge | 296/69 |

FOREIGN PATENT DOCUMENTS

| | | | |
|---|---|---|---|
| 1,196,603 | 11/1959 | France | 297/65 |
| 1,076,535 | 7/1975 | United Kingdom | 296/65 R |

Primary Examiner—Joseph F. Peters, Jr.
Assistant Examiner—John A. Carroll
Attorney, Agent, or Firm—Alter and Weiss

[57] ABSTRACT

A lounge for recreational vehicles comprises a pair of bench-type seats with backs adjustable to upright, reclining or horizontal positions. The seat frame portions are mounted on telescoping sliding tube assemblies cooperating with the base frame to enable each bench-type seat to be moved horizontally together to form a bed, with the seat backs in the horizontal position. The telescoping tube portion of the seat frame is normally latched in place in the unextended position, and a single control lever selectively adjusts the seat back rake or releases the latch holding the telescoping portion in place.

13 Claims, 18 Drawing Figures

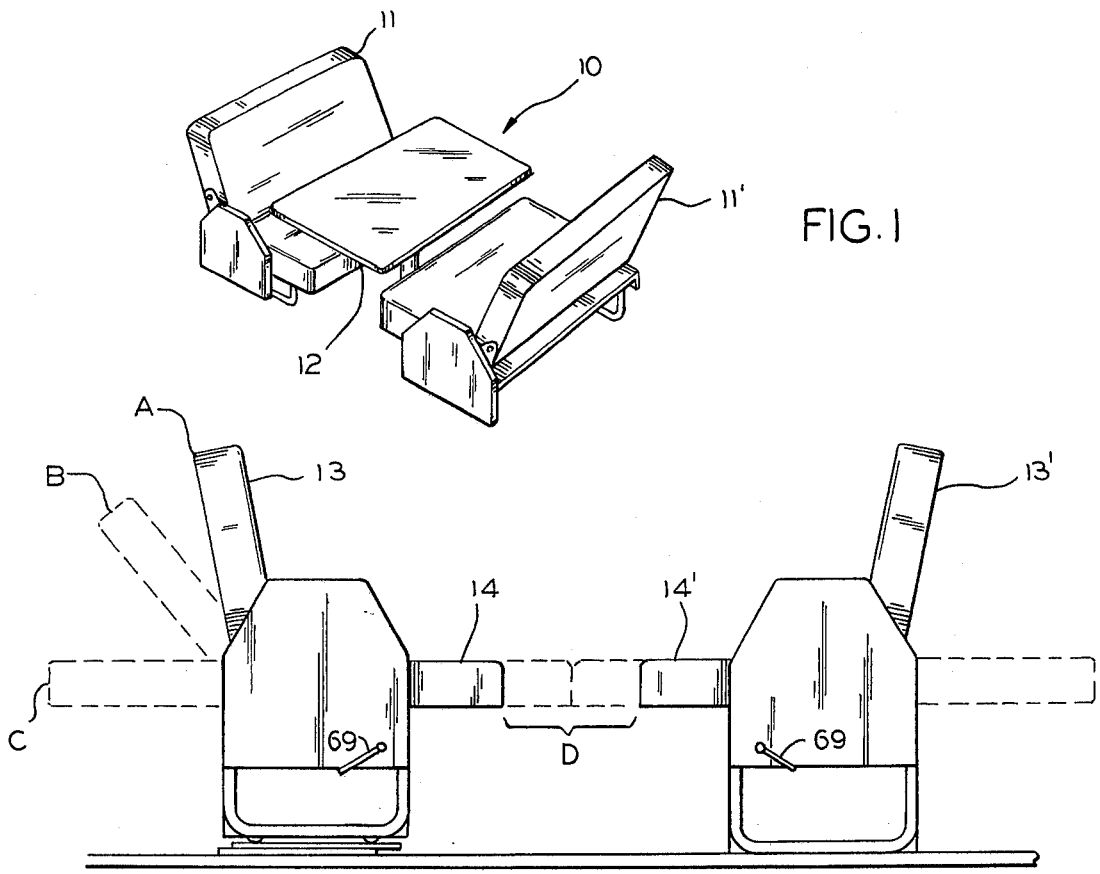
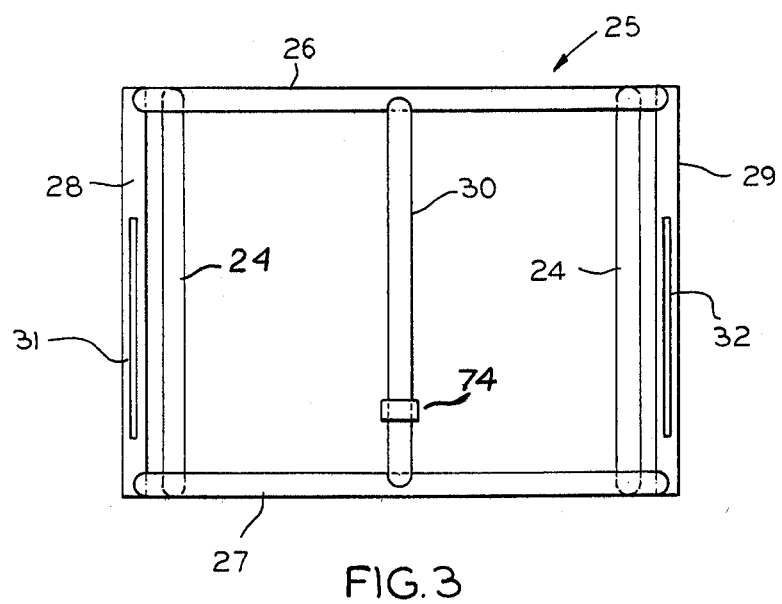

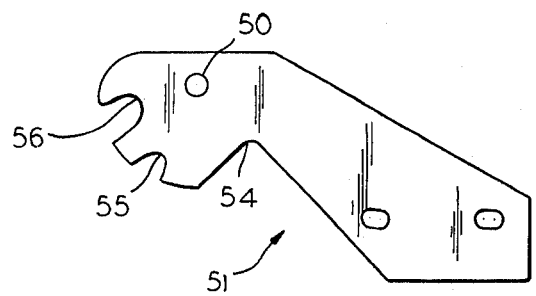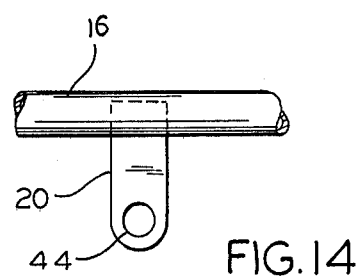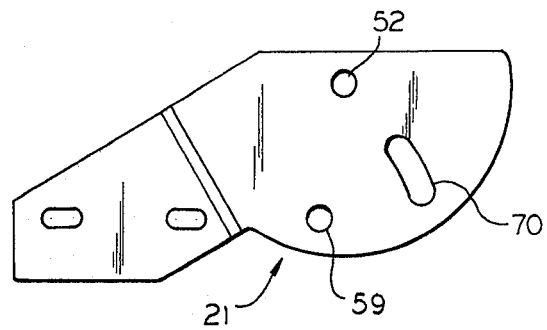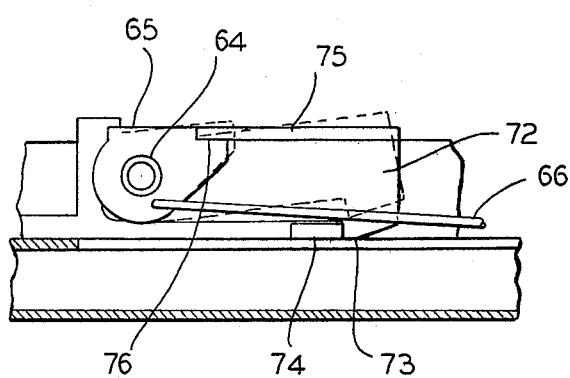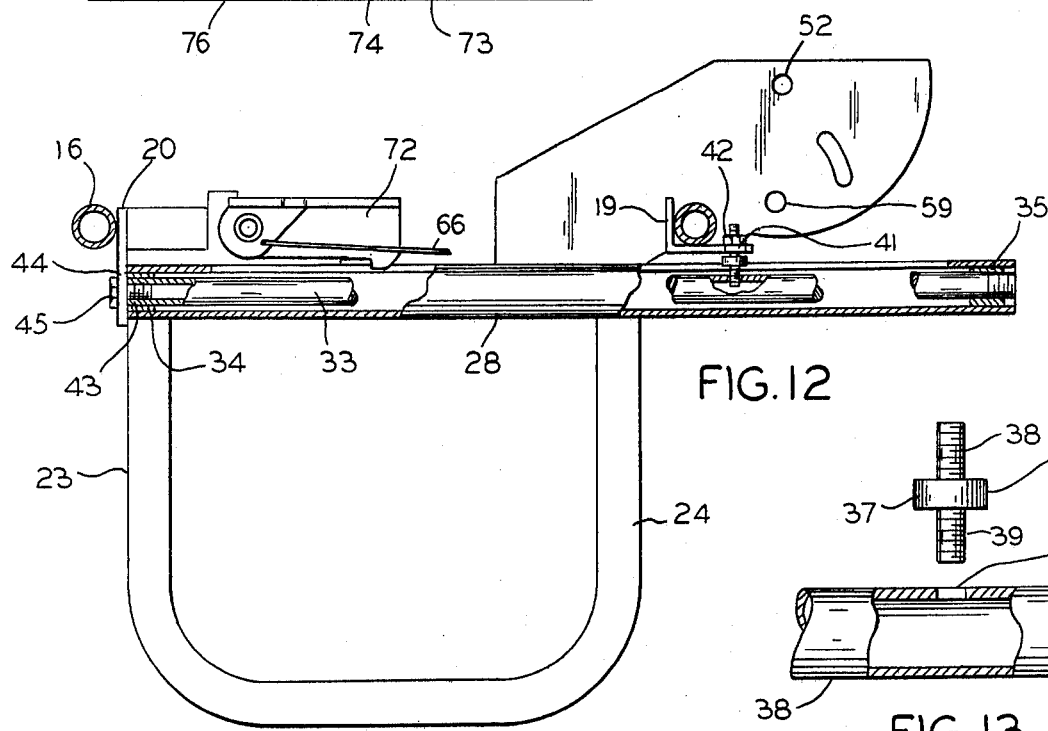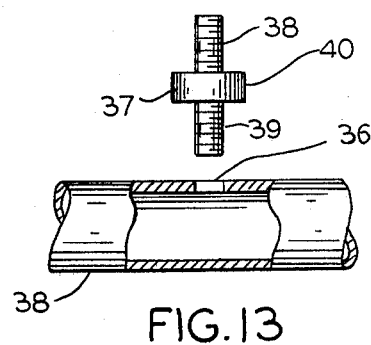

SEAT ASSEMBLY

This invention relates to automotive seating arrangements and more particularly to a mobile lounge unit selectively convertible to afford sleeping or seating accommodations.

Outfitting recreational vehicles and mobile homes or the like with seating often requires that the seating unit selected be adaptable to perform a number of functions. Since space is necessarily limited within the interior of such vehicles, seating units may be required to function as sleeping and dining facilities as well as passenger seating facilities. Typically, such a seating arrangement involves adjustment of certain portions of the seating structure with respect to others.

Prior seating and lounge arrangements have suffered from balky, inconvenient or inefficient adjustment mechanisms. In particular, it has been difficult to provide a high degree of adjustability within the severe space limitations inherent in such vehicles. Users may find that awkward and inconvenient exertions are required to place such seats in desired positions.

As an example, prior seat mechanisms featured track members along which the seat portion may be extensibly moved into position to be used as a bed. Such mechanisms tend to bind unless the seat portion used is extended in such a manner as to maintain the seat portion and track members in perfect alignment. Should any lateral misalignment occur, the mechanism will jam or bind. Such alignment is most easily maintained when the user stands directly in front of the seat member and pulls from the center of the seat. Unfortunately, this places the user directly in the path of extension, and when two such seat members are being extended one toward the other the user will find himself in an awkward position. Such an extension would be most conveniently carried out with the user standing to one side of the seat portion. Unfortunately, it is in this position that misalignment is most apt to occur since the user is pulling at one end of the seat portion rather than the center.

Accordingly, the present invention has the following objects:

To provide lounge structures adjustable to perform a number of functions within recreational type vehicles;

To provide such lounges with seat backs adjustable to upright, reclining or fully horizontal positions;

To provide such lounges in versions fully convertible to sleeping facilities by having the seating portions slideably extendable one toward the other;

To provide such sliding seat portions with easy to operate sliding mechanisms;

To provide such sliding mechanisms in forms greatly lessening the possibility of misalignment or binding during extension;

To provide such lounges in versions whereby extension of the seat portion and reclining of the back mechanism may be accomplished through use of a single control; and To provide such lounges in versions easily adjustable by a user standing at the side of the lounge.

These and further objects will become more apparent upon consideration of the accompanying drawings in which;

FIG. 1 is a perspective view of the inventive lounge assembly illustrated as a dining unit;

FIG. 2 is a side elevation of the device in FIG. 1 with the fully horizontal and reclining adjustments illustrated in phantom;

FIG. 3 is a top plan view of the base frame assembly;

FIG. 9 is a detail view of the inner hinge;

FIG. 10 is a detail view of the outer hinge;

FIG. 11 is a side view of the seat latch assembly with the release position indicated in phantom;

FIG. 12 is a side view in partial section of the telescoping seat tube assembly;

FIG. 13 is a detail of the twin male connector of FIG. 12;

FIG. 14 is a detail of a support plate mounted to the seat frame assembly;

Figure 4:
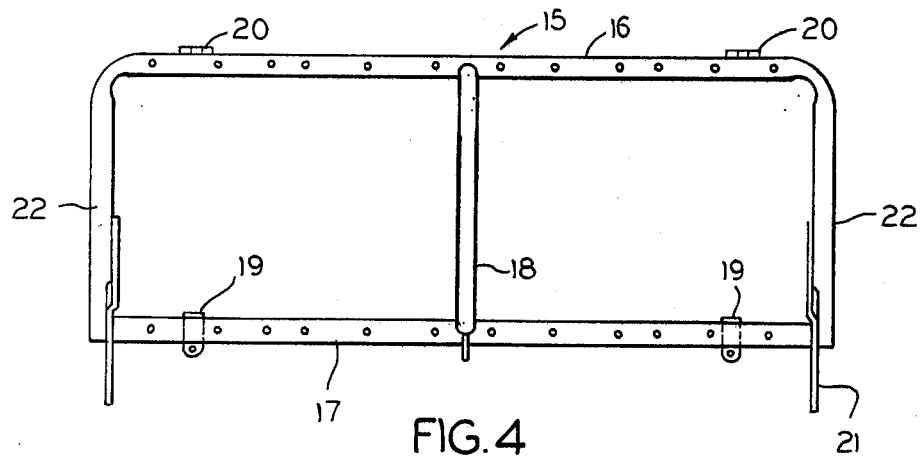
FIG. 4 is a top plan view of the seat frame assembly.

Consistent with the foregoing objects, Applicant herein provides a mobile lounge 10 having seat assemblies 11 and 11', each seat assembly having a seat assembly 15 with slot and hinge members 21, and back assembly 45 with notched hinged members 51. Rod 58 is pivotally mounted to hinges 21 with pins 61 extending through slots 70 to selectively engage notches 54, 55 or 56 on hinges 51, whereby seat back 45 may be placed in an upright, reclining or horizontal attitude with respect to seat assembly 15. Seat assembly 15 and back assembly 45 are telescopically extensibly supported by base 23 whereby outer extension tube 28, attached to support frame 23, slideably accommodates inner extension bar 33 to which seat frame 15 is attached by bracket 19 and fastener 40 at the rear, and by mounting plate 20 and fastener 45 at the front. Latch 72 secures seat frame 15 in an unextended attitude. Control rod 64, when operated in a first direction, enables a user to selectively rake back frame assembly 82 with respect to seat frame 15; when operated in a second direction, control rod 64 allows movement of seat frame 15 by moving latch cam 64 to raise latch plate 72.

Referring now to FIG. 1 the numeral 10 indicates generally a mobile lounge unit having bench-type seat assemblies 11 and 11' with table assembly 12 mounted in between. In this configuration, the mobile lounge may be utilized as a dining area.

Each seat back 13 and 13' may be adjusted to an upright position A, or as shown in phantom, a reclining position B or a fully horizontal position C.

With table assembly 12 removed, seats 14 and 14' may be extended to meet as illustrated at D of FIG. 2. With backs 13 and 13' in the fully reclined position lounge unit 10 may then be converted to a bed.

Adjusting lounge unit 10 is most conveniently carried out when the lounge may stand to the side of the unit rather than between seat assemblies 11 and 11'. Adjustment of the individual seat assemblies is also facilitated when a single easy-to-reach lever is provided to control both extension and reclining adjustments.

Figure 5:
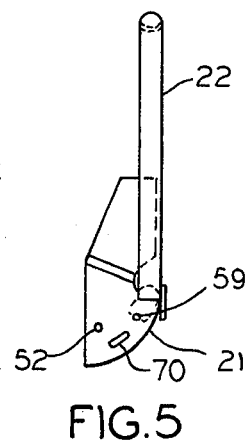
FIG. 5 is a side view of the outer hinge assembly mounted to the frame of FIG. 4.

Seat 14 is supported on seat frame 15 as illustrated in FIG. 4. Seat frame 15 includes tubular frame members 16 and 17 and transverse brace member 18 welded to frame member 17, forming the rear of the seat frame while support plates 20 are welded to frame member 16 at the front of seat frame 15. Outer hinge members 21, detailed to FIG. 10, are fastened to frame member portions 22, as illustrated in FIGS. 4 and 5.

To provide support and extensibility for seat frame 15, support frame 23 is provided, as illustrated in FIG. 12. Support frame 23 includes tubular support legs 24 welded to support base 25, having front support member 26, rear support member 27, side support members 28 and 29, and transverse brace member 30 welded together in a rigid configuration, as shown in FIG. 3. Side support members 28 and 29 have slots 31 and 32 formed respectively axially along the upper surface of each tubular frame member. Each side support member 28 and 29 has telescopically associated therewith a seat extension tube 33, as illustrated at FIG. 12. Nylon bearing member 34 is mounted within side frame tube 28, with extension tube 33 passing therethrough, rear bearing member 35 is attached to extension tube 33 and provides support for tube 33 during extension and reduced sliding friction.

Attachment of seat frame 15 to support frame 25 is accomplished through use of bracket 19 and support plate 20. Said bracket and support plate allow attachment of seat frame 15 to extension tube 33 in such a manner as to allow seat frame 15 to be extended.

As detailed in FIG. 13, each extension tube 33 has formed therein tapped apertures 36. Mounting fastener 37 has male threaded portions 38 and 39 extending on opposite sides of plug 40. Male portion 39 is threaded to fit tapped aperture 36 while male portion 38 may be inserted through bracket aperture 41 to be secured by nut 42. Since bracket 19 is welded to seat frame member 17, fastener 37 provides a rigid point of attachment for seat frame 15 to support frame 25.

Attachment of seat frame 15 is completed through use of mounting plate 20 welded to front seat frame member 16 as shown in FIG. 14. Extension tube 33 is dimensioned to abut mounting plate 20 when bracket 19 has been attached to extension tube 33. The front internal portion of tube 33 is tapped as illustrated at 43 of FIG. 12, and mounting plate 20 has aperture 44 formed therethrough to align with extension tube 33, thereby allowing attachment tube bracket 20 by bolt 45.

In the presently described embodiment, support frame 25 is provided with two such telescoping extension tube assemblies, thereby providing four secure points of attachment for seat frame 15. More such telescoping tube assemblies may be provided if desired for wider seat assemblies.

Figure 6:
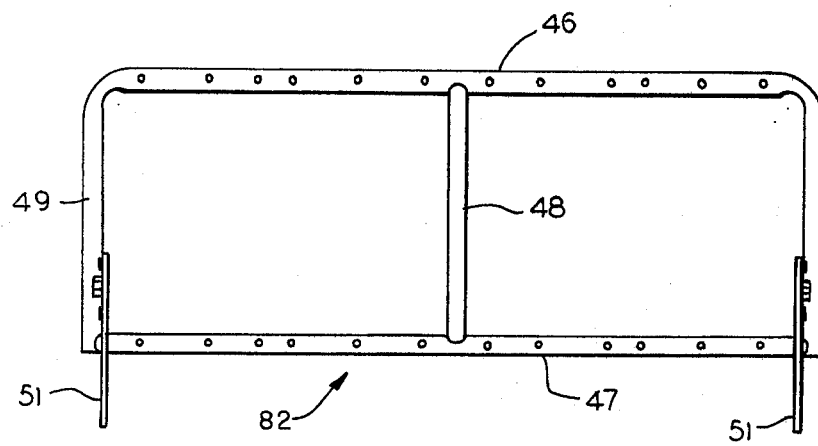
FIG. 6 is a front plan view of the seat back assembly.
Figure 7:
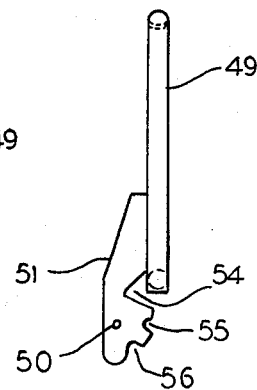
FIG. 7 is a side view of the inner hinge assembly mounted to the frame of FIG. 6.
Figure 8:
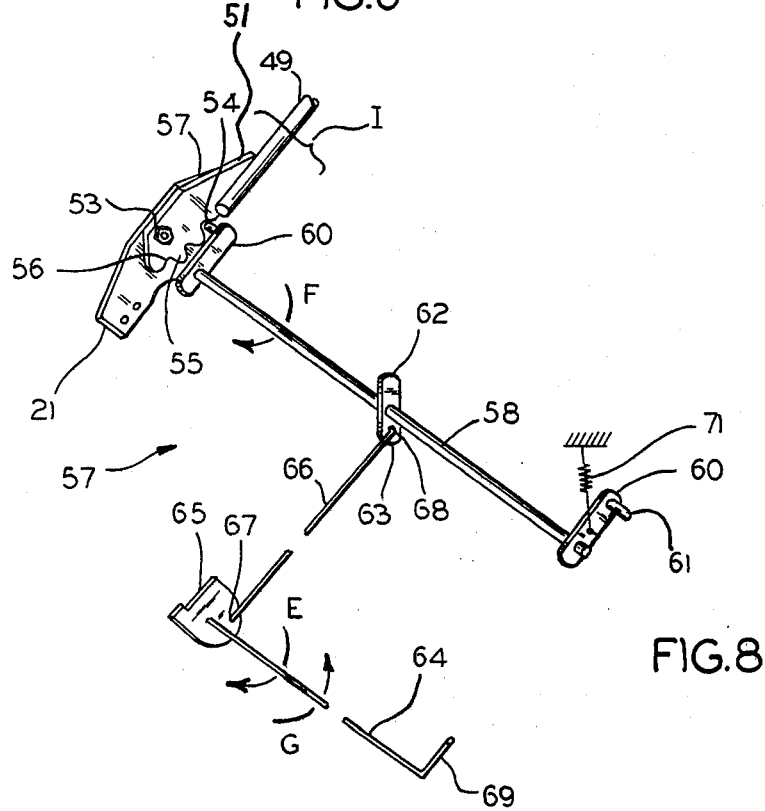
FIG. 8 is a perspective plan view of the seat control assembly.
Figure 15:
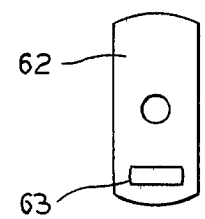
FIG. 15 is a detail of the cam tongue.

As illustrated in FIG. 6, back frame assembly 82 is formed by tubular frame members 46, 47 and 48 welded into a rigid configuration. Frame member portions 49 have attached respectively thereto inner hinge members 51. Each such hinge member has formed therethrough a pivot aperture 50 alignable with pivot aperture 52 on outer hinge 21. Fastener 53 is then inserted therethrough to pivotally connect inner hinge member 51 with outer hinge member 21, as illustrated in FIG. 8. Thus, as seat 14 is extended, back 13 follows.

As illustrated in FIG. 9, each inner hinge 51 has formed thereon detents 54, 55 and 56 which allow back frame 45 to be maintained in either an upright, reclining, or horizontal position. Movement of seat back 45 from one position to another is controlled by seat adjustment mechanism 57 as illustrated schematically in FIG. 8.

Rod 58 is rotatably supported at each of its ends by outer hinges 21 at rod apertures 59. A lock pin plate 60 is non-rotatably mounted proximate each end of rod 58, exposing a sufficient length of rod 58 to allow said rod to rotatably extend through apertures 59. Lock pin 61 is mounted to lock pin plate 60 extending in a direction toward outer hinge 21. Thus, rotation of rod 58 produces a corresponding arcuate movement of lock pin 61.

Cam tongue 62 is non-rotatably mounted at a point intermediate lock pin plates 60 on rod 58 and has formed therein tongue slot 63. Control rod 64 is rotatably supported at a convenient site forward of rod 58, and latch cam 65 is non-rotatably affixed to control rod 64 and is joined to cam tongue 62 by cam tie rod 66. Cam tie rod 66 is pivotally mounted to latch cam 65 at 67 and extends through cam tongue slot 63 as shown at 68. Control handle 69 extending from control rod 65 allows manual rotation of control rod 64 with a corresponding rotation of latch cam 65.

Raising or lowering control handle 69 causes a corresponding rotation of control rod 64. This in turn causes a corresponding linear movement of tie rod 66 through cam tongue slot 68. When the end of travel in cam tongue 68 is reached, rotation of rod 58 occurs with a corresponding arcuate movement of lock pin plates 60 and lock pins 61 in arcuate slots 70. As indicated in FIG. 8, movement of control rod 64 in a direction E produces a corresponding rotation of rod 58 in a direction F. Rotating control rod 64 in a direction G produces no corresponding rotation of rod 58 since tie rod 66 moves in tongue slot 63.

When inner hinge 51 is pivotally mounted to outer hinge 52, detents 54, 55 and 56 are positioned to selectively engage lock pin 61. Detail I of FIG. 8 illustrates the relative positioning of inner hinge 51 with respect to outer hinge 21 when seat back 45 is in a fully horizontal position. To elevate seat back 45, control rod 65 is rotated in direction E causing a subsequent rotation of rod 58 in direction F, thereby drawing lock pin 61 out of detent 54. Seat back 45 may then be manually elevated to align detent 55 with lock pin 61 and control rod 65 may then be released whereby the action of retaining spring 71 will draw lock pin 61 into detent 55 thereby positively securing seat back 45 in an intermediate reclining position. In like fashion, seat back 45 may be adjusted to a fully upright position.

To convert lounge structure 10 to a facility for sleeping, table 12 is removed. Next, seat back 45 is lowered to the fully horizontal position and seats 14 and 14' extension tubes 33 are pulled forward until seat portions 14 and 14' abut as illustrated at D of FIG. 2. Means are provided to latch seats 14 and 14' to prevent accidental movement, for example, during braking and acceleration of the vehicle. Release of the latching mechanism is conveniently provided by manipulation of control for all lounge seat functions.

Figure 16:
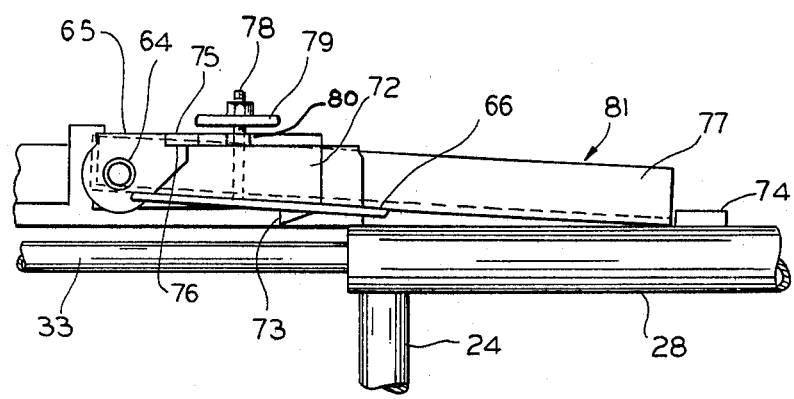
FIG. 16 is a partial sectional view of the latch extension assembly in a locked position.

The presently contemplated embodiment of the latching mechanism is illustrated at FIGS. 16 and 12 wherein FIG. 16 shows the seat assembly in an extended attitude, and FIG. 12 shows the seat assembly in an unextended attitude. Latch plate 72 is rotatably mounted on control rod 64 proximate to latch cam 65. Latch plate 72 has formed thereon shoulder 73, and latch stop member 74 is positioned on seat frame member 18 as illustrated in FIG. 3, and engages shoulder 73 when latch plate 72 is in a lowered position, as shown in FIG. 12. Tab 75 of latch plate 72 is dimensioned to extend to and engage cam shoulder 76 of latch cam 64. In this position, latch plate 72 may be rotatably raised to disengage shoulder 73 from stop member 74 by rotation of control rod 64 in direction E as illustrated in FIG. 8. Seat members 14 and 14' may then be extended as desired. Since rotating control rod 64 results in linear movement of cam tie rod 66, it is necessary that provision be made to allow latch plate 72 to be raised without causing rotation of rod 58 in direction F. For this purpose, slot 63 is formed in cam tongue 62 to allow cam tie rod 66 to move linearly a sufficient distance to enable latch plate 72 to be raised while precluding any rotational movement of rod 58.

Figure 17:
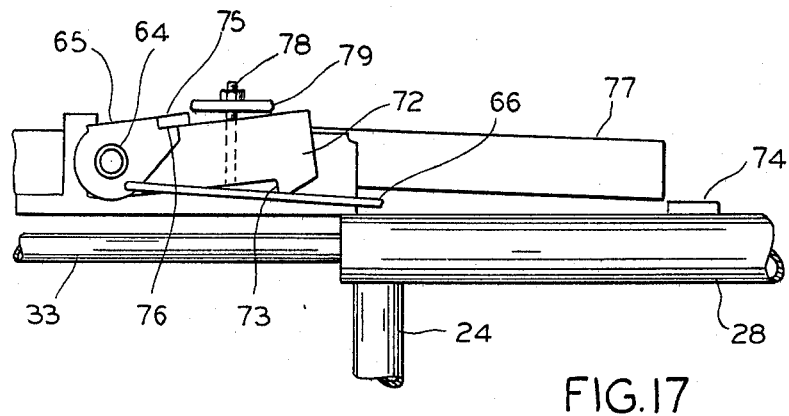
FIG. 17 is a partial sectional view of the latch extension assembly in an unlocked position.
Figure 18:
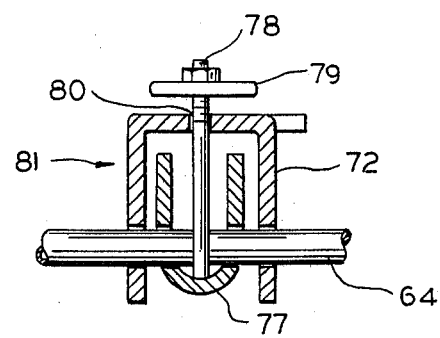
FIG. 18 is a cross-sectional view of the latch plate and latch extension assembly.

To secure seat frame 15 in an extended position, latch extension assembly 81 is provided, as shown in FIGS. 16, 17 and 18. Latch arm 77 is pivotally mounted to rod 64 and has shaft 78 and bumper 79 attached thereto. Shaft 78 passes through aperture 80 formed in latch plate 72, and rotation of rod 64 will lift latch plate 72 to contact bumper 79, thereby pivotally lifting latch extension 77. When seat assembly 15 is in an unextended attitude, as in FIG. 12, latch extension rests on a portion of the upper surface of stop 74.

When seat assembly 15 is extended, latch extension 77 is similarly extended until stop 74 is cleared; latch extension then drops down to prevent inward movement of seat assembly 15, as shown in FIG. 16. To defeat latch extension 77, control rod 64 is rotated in the same direction as to defeat latch plate 72, as shown in FIG. 17. In this manner, control rod 64 allows control of seat rake, as well as unlatching in either an extended or unextended attitude.

Use of the inventive lounge is illustrated as follows. A user wishing a recline seat back 13 from fully upright position A to reclining position B would depress control handle 69 to produce rotation of rod 58 in direction H thereby drawing lock pins 61 out of detents 56 of inner hinges 51. At this point, seat back 13 may be manually lowered to position B at which point control handle 69 may be released and retaining springs 71 will draw lock pins 61 firmly into detents 55 thereby maintaining seat back 13 in a reclining position. To fully recline seat back 13 to position C, control handle 69 is again depressed to produce rotation of rod 58 in direction H, whereupon said seat back may be lowered to position C and lock pins 61 may be allowed to re-engage detents 54 of inner hinges 51. Extension of seat portion 14 may be accomplished when seat back 13 is in either position A, B, or C and is accomplished by raising control handle 69 in a direction opposite to that used to adjust said seat back. Such rotation causes latch cam 65 to rotate upward and engage latch plate 72 thereby raising latch plate 72 a sufficient distance to disengage it from stop member 74. Seat 14 may then be conveniently extended as illustrated at D of FIG. 2. Sliding friction incurred when extension tubes 33 are manually moved within support tubes 28 is minimized through use of nylon bushings 34 and nylon bearings 35. Rigid attachment of seat frame 16 to extension tubes 33 assures that correct alignment of extension tubes 33 with frame support tubes 28 will be maintained, thus minimizing any binding or misalignment. It is thus apparent that each individual lounge seat structure is conveniently and simply adjustable through use of a single control handle and adjustment may be carried out in a position convenient to the user. Such lounges may be used individually, or in tandem as shown in FIG. 1.

While the foregoing has presented a specific embodiment of the invention, it is to be understood that this embodiment is presented by way of example only. It is expected that others skilled in the art will perceive variations which, while differing from the foregoing, do not depart from the spirit and scope of the invention.

I claim:

1. A seat assembly for a vehicle, said seat assembly comprising:

a base, said base being anchored to the floor of said vehicle;

at least one seat on said base, said seat including a seat frame, said seat further including a back, said back including a back frame, said back frame being pivotally associated with said seat frame whereby the rake of said back frame with respect to said seat frame is variable;

means to selectively recline said back frame with respect to said seat frame, and to maintain a selected attitude of rake of said back frame with respect to said seat frame;

means to extend said seat frame with respect to said base, said seat extension means including means to telescopically cooperate with said base;

means to mount said seat frame to said seat extension means; and means to control said reclining means and said seat extension means to selectively adjust and maintain said rake and to allow said seat extension means to be operated to move said seat frame with respect to said base.

2. The apparatus as recited in claim 1 wherein said control means includes a single actuator, said single actuator allowing selective adjustment of said rake when operated in a first direction, and said single actuator allowing selective movement of said seat frame with respect to said base when operated in a second direction.

3. The apparatus as recited in claim 1 wherein said control means includes means to latch said seat extension means with respect to said base, said latch means being selectively defeatable by operation of said single acutator in said second direction.

4. The apparatus as recited in claim 3 wherein said latch means maintains said seat extension means in extended and unextended positions relative to said base.

5. The apparatus as recited in claim 1 wherein said telescoping means includes a tubular member integral with said base;

a shaft member, said seat frame being secured to said shaft member by said seat mounting means, said shaft member and said tubular means being telescopically slideably associated to extend said seat frame with respect to said base.

6. The apparatus as recited in claim 5 wherein each said tubular member has slots formed axially therethrough; and each said shaft member has at least one tapped aperture formed therethrough.

7. The apparatus as recited in claim 6 wherein said seat mounting means includes a plug member having a pair of oppositely disposed faces,
first and second threaded shafts,
said first shaft extending from one said face and said second shaft extending from the remaining face,
said first of said shafts being threadably engageable through one said slot into one said tapped aperture;
a first mount attached to said seat frame,
said first mount engaging said second of said threaded shafts whereby extension of said shaft member results in axial movement of said seat frame along said tubular member.

8. The apparatus as recited in claim 7 wherein said seat mounting means further includes a second mount,
said second mount being attached to said seat frame,
said second mount having a mount aperture formed therethrough,
said second mount co-axially aligning said mount aperture with said shaft member when said first mount is engaged with said second shaft member; and
means to fasten said second mount to said shaft segment.
means to fasten said second mount to said shaft segment.

9. The apparatus as recited in claim 1 wherein said reclining means includes first and second hinge plates,
said first hinge plate having formed thereon a series of detents,
said second hinge plate having a pin element pivotally associated therewith,
one said hinge plate being associated with said seat frame,
the remaining hinge plate being associated with said back frame,
said pin selectively engageable with and disengageable from said detents to maintain said back frame in a selected attitude of rake with respect to said seat frame.

10. The apparatus as recited in claim 9 wherein said first and second hinge plates are joined to form a pivot.

11. A lounge assembly for a vehicle, said assembly comprising a pair of seat assemblies;
each said seat assembly having a base anchored to the floor of said vehicle;
a seat supported by each said base,
each said seat further including a back,
said back being pivotally associated with said seat whereby the rake of said back with respect to said seat is selectively variable;
means for reclining said back with respect to said seat,
said reclining means selectively maintaining said rake of said back with respect to said seat,
means to extend said seat and said back with respect to said base,
said extension means telescopically associated with said base;
means to control said extension means and said reclining means, said control means selectively allowing said rake to be adjusted and selectively allowing operation of said extension means;
said seat assemblies being arranged to face on another,
said seats, when extended, and said backs, when fully raked, forming a horizontal surface.

12. The apparatus as recited in claim 11 wherein said control means includes single actuator,
said actuator selectively allowing said rake of each said backs to be adjusted when operated in a first direction, and
said actuator selectively allowing extension of each said seat with respect to each said base when operated in a second direction.

13. The apparatus as recited in claim 11 wherein said extension means includes a first tubular element integral with each said base;
a second tubular element,
said second tubular element secured to said seat,
said first and second tubular elements telescopically slideable associated whereby said seat may be extended with respect to said base.

* * * * *

UNITED STATES PATENT AND TRADEMARK OFFICE
CERTIFICATE OF CORRECTION

PATENT NO. : 4,085,962
DATED : April 25, 1978
INVENTOR(S) : Robert A. Wahls

It is certified that error appears in the above-identified patent and that said Letters Patent are hereby corrected as shown below:

Col 2, Line 66: Between the words lounge and may, add the word --user--.

Col 5, Line 38: After the word wishing, delete the word "a" and insert the word --to--.

Col 7, Lines 25 and 26: Delete the whole sentence.

Signed and Sealed this

Nineteenth Day of September 1978

[SEAL]

Attest:

RUTH C. MASON
Attesting Officer

DONALD W. BANNER
Commissioner of Patents and Trademarks